(12) United States Patent
Ogushi et al.

(10) Patent No.: US 12,090,750 B2
(45) Date of Patent: *Sep. 17, 2024

(54) PRINTING APPARATUS AND METHOD OF CONTROLLING PRINTING APPARATUS

(71) Applicant: CANON KABUSHIKI KAISHA, Tokyo (JP)

(72) Inventors: Takuhiro Ogushi, Kanagawa (JP); Toshiyuki Kitazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 17/864,670

(22) Filed: Jul. 14, 2022

(65) Prior Publication Data

US 2022/0348029 A1 Nov. 3, 2022

Related U.S. Application Data

(63) Continuation of application No. 17/166,235, filed on Feb. 3, 2021, now Pat. No. 11,420,451.

(30) Foreign Application Priority Data

Feb. 19, 2020 (JP) .................................. 2020-026146

(51) Int. Cl.
*B41J 11/00* (2006.01)
*G06K 15/02* (2006.01)
*G06K 15/10* (2006.01)

(52) U.S. Cl.
CPC ........ *B41J 11/0095* (2013.01); *B41J 11/0065* (2013.01); *B41J 11/008* (2013.01);
(Continued)

(58) Field of Classification Search
CPC ... B41J 11/0095; B41J 11/0065; B41J 11/008; B41J 29/393; B41J 2203/01
See application file for complete search history.

(56) References Cited

U.S. PATENT DOCUMENTS 7,862,139 B2   1/2011   Takeishi et al.
11,420,451 B2*  8/2022  Ogushi ................ G06K 15/102
(Continued)

FOREIGN PATENT DOCUMENTS

JP    2004-269078 A    9/2004
JP    2007-276888 A   10/2007
(Continued)

OTHER PUBLICATIONS

Japanese Office Action dated Nov. 21, 2023, in related Japanese Patent Application No. 2020-026146.

*Primary Examiner* — Julian D Huffman
(74) *Attorney, Agent, or Firm* — Venable LLP

(57) ABSTRACT

A printing apparatus includes a conveyance unit configured to convey a sheet in a conveyance direction, a print unit configured to perform printing on the sheet conveyed by the conveyance unit, a light receiving unit configured to receive light and make an output according to the received light, and a control unit configured to control borderless printing by the print unit, the borderless printing including extra-printing from a sheet edge to outside of the sheet. The control unit sets an extra-printing amount by which printing extends off the sheet edge after the light receiving unit makes the output according to the received light.

22 Claims, 10 Drawing Sheets

(52) U.S. Cl.
CPC ....... *G06K 15/102* (2013.01); *G06K 15/1805*
(2013.01); *B41J 2203/01* (2020.08)

(56) References Cited

U.S. PATENT DOCUMENTS

| | | |
|---|---|---|
| 2005/0225626 A1 | 10/2005 | Igarashi et al. |
| 2014/0146102 A1 | 5/2014 | Mizes et al. |

FOREIGN PATENT DOCUMENTS

| | | |
|---|---|---|
| JP | 4245024 B2 | 3/2009 |
| JP | 2000-109243 A | 4/2009 |
| JP | 2016-049653 A | 4/2016 |

\* cited by examiner

PRINTING APPARATUS AND METHOD OF CONTROLLING PRINTING APPARATUS

This application is a continuation of application Ser. No. 17/166,235, filed Feb. 3, 2021.

BACKGROUND OF THE INVENTION

Field of the Invention

The present invention relates to a printing apparatus and a method of controlling a printing apparatus.

Description of the Related Art

Among printing apparatuses, there are apparatuses that detect the positions of edges of a print sheet and minimize the amount of ink to be ejected to the outside of the print sheet, for reduction of the amount of ink consumption in borderless printing, lengthening of the life of a waste ink collection mechanism, and so on.

Japanese Patent Laid-Open No. 2000-109243 discloses a printing apparatus having a carriage unit equipped with a reflection-type optical sensor capable of detecting the positions of edges of a print sheet. This printing apparatus detects the positions of edges of a sheet with the sensor during printing of an image onto the sheet using a head mounted on the carriage unit. Also, in consideration of the variation in sensor characteristics, the variation in attachment position, and the like, this printing apparatus adjusts the amount of light to be emitted such that a target output level can be obtained from a light receiving unit of the reflection-type optical sensor while the sensor is above the print sheet. This adjustment of the amount of light to be emitted is performed prior to the printing operation, during which the sheet edge detection is actually performed.

Here, ambient light may get in through a sheet discharge port or the like and the light receiving unit of the sensor may receive the ambient light as well as light from a light emitting unit. Thus, the amount of ambient light may be different between when the amount of light to be emitted is adjusted and when the printing operation is performed with the sheet edge detection. This may deteriorate the accuracy of the sheet edge detection. Consequently, the printing start position and the printing end position at the sheet edges may be shifted, leading to a failure to print the desired image.

SUMMARY OF THE INVENTION

A printing apparatus according to an aspect of the present invention includes: a carriage configured to move in a direction crossing a conveyance direction of a print sheet; a detection unit disposed on the carriage and having a light emitting unit for emitting light and a light receiving unit for making an output according to received light, the detection unit being configured to detect a sheet edge of the print sheet based on the output from the light receiving unit when the light emitting unit emits light to the print sheet; an adjustment unit configured to adjust at least one of an amount of light to be emitted from the light emitting unit and the output from the light receiving unit such that the output from the light receiving unit when the light emitting unit emits light to a predetermined position on the print sheet is at a predetermined level; and a control unit configured to control an extra-printing amount by which printing extends off the sheet edge, after the adjustment by the adjustment unit but before the detection of the sheet edge by the detection unit, based on the output from the light receiving unit.

Further features of the present invention will become apparent from the following description of exemplary embodiments with reference to the attached drawings.

DESCRIPTION OF THE EMBODIMENTS

A printing apparatus according to an embodiment of the present invention will be described below with reference to the drawings. It should be noted that the following embodiment does not limit the present invention and that not all of the combinations of the features described in the present embodiment are necessarily essential for the solution provided by the present invention. Also, in this embodiment, an inkjet printing apparatus will be described as an example of the printing apparatus.

<Internal Configuration of Printing Apparatus>

Figure 1:
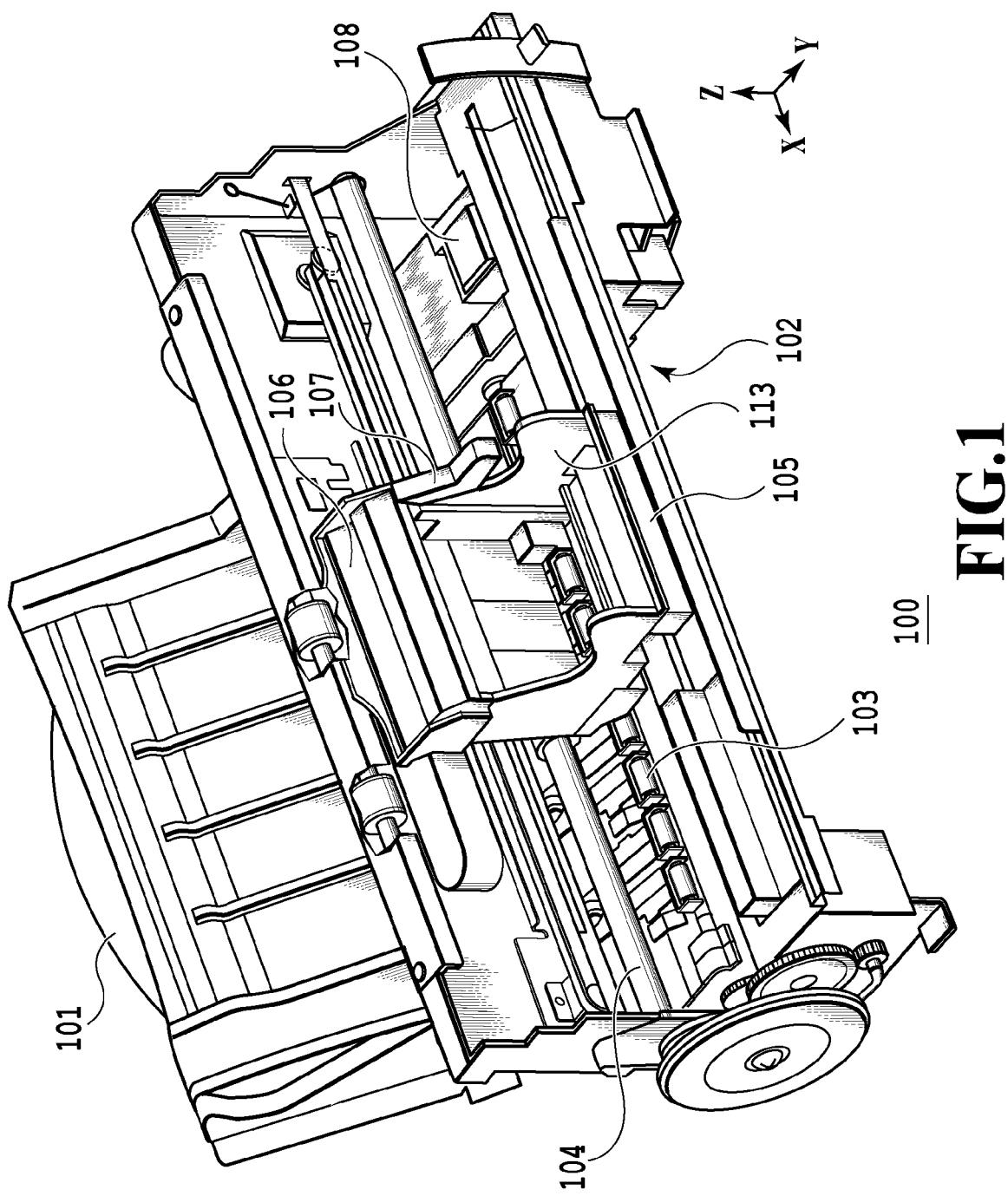
FIG. 1 is a diagram of an internal configuration of a printing apparatus.

FIG. 1 is a diagram of an internal configuration of an inkjet printing apparatus 100 (hereinafter the printing apparatus 100). The printing apparatus 100 includes an automatic feed unit 101, a conveyance unit 103, and a recovery unit 108.

The automatic feed unit 101 automatically feeds print media such as print sheets into the main body of the apparatus. The conveyance unit 103 guides each print medium individually fed from the automatic feed unit 101 to a predetermined printing position and further guides the print medium from the printing position to a discharge unit 102. The recovery unit 108 performs a recovery process on a printing unit that performs desired printing on a print medium conveyed to the printing position. The printing unit includes a carriage 105 supported on a carriage shaft 104 so as to be movable in a main scanning direction indicated by the arrow X, and a print head 10 (see FIG. 2) detachably mounted on the carriage 105. The main scanning direction is a direction crossing the conveyance direction in which a print medium is conveyed.

The carriage 105 is provided with a carriage cover 106 and a head set lever 107 that engage with the carriage 105 to guide the print head to a predetermined mount position on the carriage 105. The head set lever 107 engages with a tank holder 113 of the print head 10 to set the print head 10 in the predetermined mount position. At an upper portion of the carriage 105, a head set plate (not illustrated) that is biased by a spring toward a portion to be engaged with the print head 10 is provided so as to be pivotable about a head set level shaft. The head set lever 107 is configured to mount the print head 10 on the carriage 105 while pressing the print head 10 with this spring force. Though not illustrated in FIG. 1, the carriage 105 is equipped with a sheet edge detection sensor 401 (described with reference to FIG. 4 to be mentioned later). The sheet edge detection sensor 401 is a sensor that measures the level of light reflection from a sheet to detect the positions of edges of the sheet.

Figure 2:
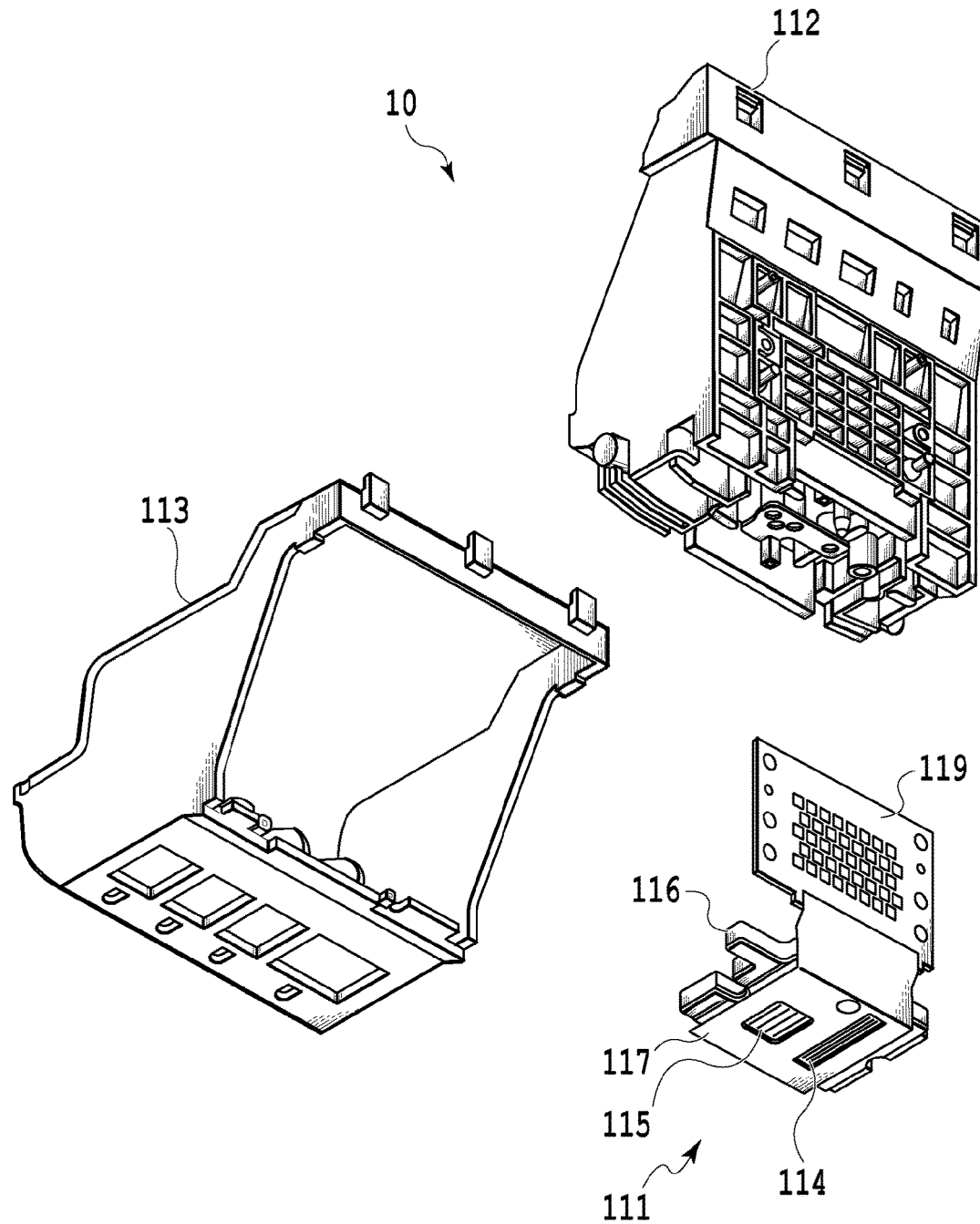
FIG. 2 is a diagram illustrating a configuration of a print head.

FIG. 2 is a diagram illustrating a configuration of the print head 10 applicable to this embodiment. The print head 10 is a side shooter-type print head that ejects droplets in a direction substantially perpendicular to a heater substrate. The print head 10 is configured of a printing element unit 111, an ink supply unit 112, and the tank holder 113. The printing element unit 111 is configured of a first printing element 114, a second printing element 115, a first plate 116, an electric contact substrate 119, and a second plate 117.

The first plate 116, whose flatness accuracy affects the ejection direction of droplets and is therefore required to be high, is made of an alumina ($Al_2O_3$) material with a thickness of 0.5 to 1 mm. The second plate 117 is a single plate-shaped member with a thickness of 0.5 to 1 mm and is laid on and fixed to the first plate 116 with a bonding adhesive therebetween. The first printing element 114 and the second printing element 115 are bonded to a surface of the first plate 116.

<Control Configuration of Printing Apparatus>

Figure 3:
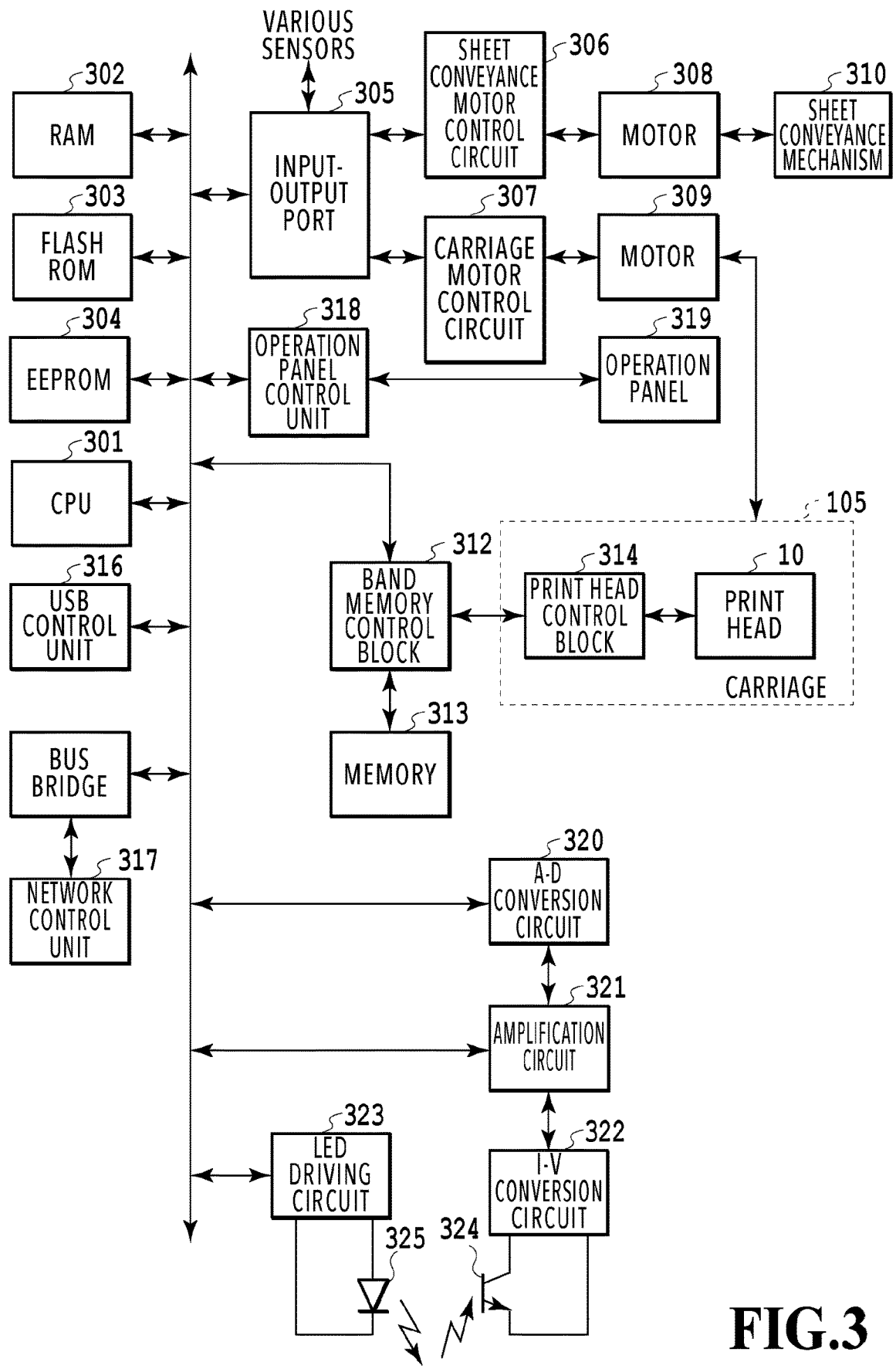
FIG. 3 is a diagram illustrating a block configuration of a control system in the printing apparatus.

FIG. 3 is a diagram illustrating a block configuration of a control system in the printing apparatus 100. A CPU 301 is capable of accessing a flash ROM 303 storing an updatable control program or processing program and an EEPROM 304 storing various pieces of constant data and the like. The CPU 301 is also capable of accessing a RAM 302 for storing command signals and image information received from a host PC (not illustrated) via a USB control unit 316 and a network control unit 317. The CPU 301 controls a printing operation based on the pieces of information stored in these memories and detection results from various sensors that are connected to an input-output port 305 and detect states of the printing apparatus.

The CPU 301 moves the carriage 105 by operating a carriage motor 309 via the input-output port 305 and a carriage motor control circuit 307. The CPU 301 also operates a sheet conveyance mechanism 310, such as a conveyance roller, by operating a sheet feed motor 308 via the input-output port 305 and a sheet conveyance motor control circuit 306. The CPU 301 further drives the print head 10 by controlling a band memory control block 312 and a print head control block 314 based on pieces of information stored in the RAM 302. In this way, a desired image can be printed on a print medium. The band memory control block 312 controls read, write, etc. of a memory 313 to be used in printing an image on a band-by-band basis by using the print head 10. Instruction information inputted via keys on an operation panel 319 is transferred to the CPU 301 via an operation panel control unit 318. Similarly, the ON/OFF of LEDs in the operation panel 319 and the display of an LCD in the operation panel 319 are controlled via the operation panel control unit 318 in accordance with a command from the CPU 301.

An LED driving circuit 323 performs an operation of turning on or off an LED 325 incorporated in the sheet edge detection sensor 401 in accordance with a command from the CPU 301. The LED driving circuit 323 is also capable of controlling the amount of current to be supplied to the LED 325 in accordance with a command from the CPU 301. In other words, the LED driving circuit 323 is an emitted light amount control unit that controls the amount of light to be emitted from the LED 325. An I-V conversion circuit 322 converts a current output from the phototransistor 324, which varies according to the intensity of light received by the phototransistor 324, into a voltage. An amplification circuit 321 serves to amplify the output of the phototransistor 324 converted into a voltage value to an optimal voltage level for performing A-D conversion. In other words, the amplification circuit 321 is a received light amount amplification unit that amplifies the amount of light received by the phototransistor 324. An A-D conversion circuit 320 converts the amplified output of the phototransistor 324 (the output of the amplification circuit 321) into a 10-bit digital signal. The gain level of the amplification circuit 321 is adjustable. The CPU 301 is capable of monitoring the level of the output voltage from the amplification circuit and making an adjustment on the gain or the amount of current to be supplied to the LED so as to obtain an optimal voltage level (hereinafter referred to as "light amount adjustment").

It has been a common practice to integrate a CPU and its peripheral circuits into a system-on-a-chip (SoC) for purposes such as saving the cost, reducing the power consumption, and increasing the speed. In the configuration in this embodiment, the CPU 301, the USB control unit 316, the band memory control block 312, and the input-output port 305 are integrated into a single IC as an SoC.

<Configuration of Sheet Edge Detection Sensor>

Figure 4:
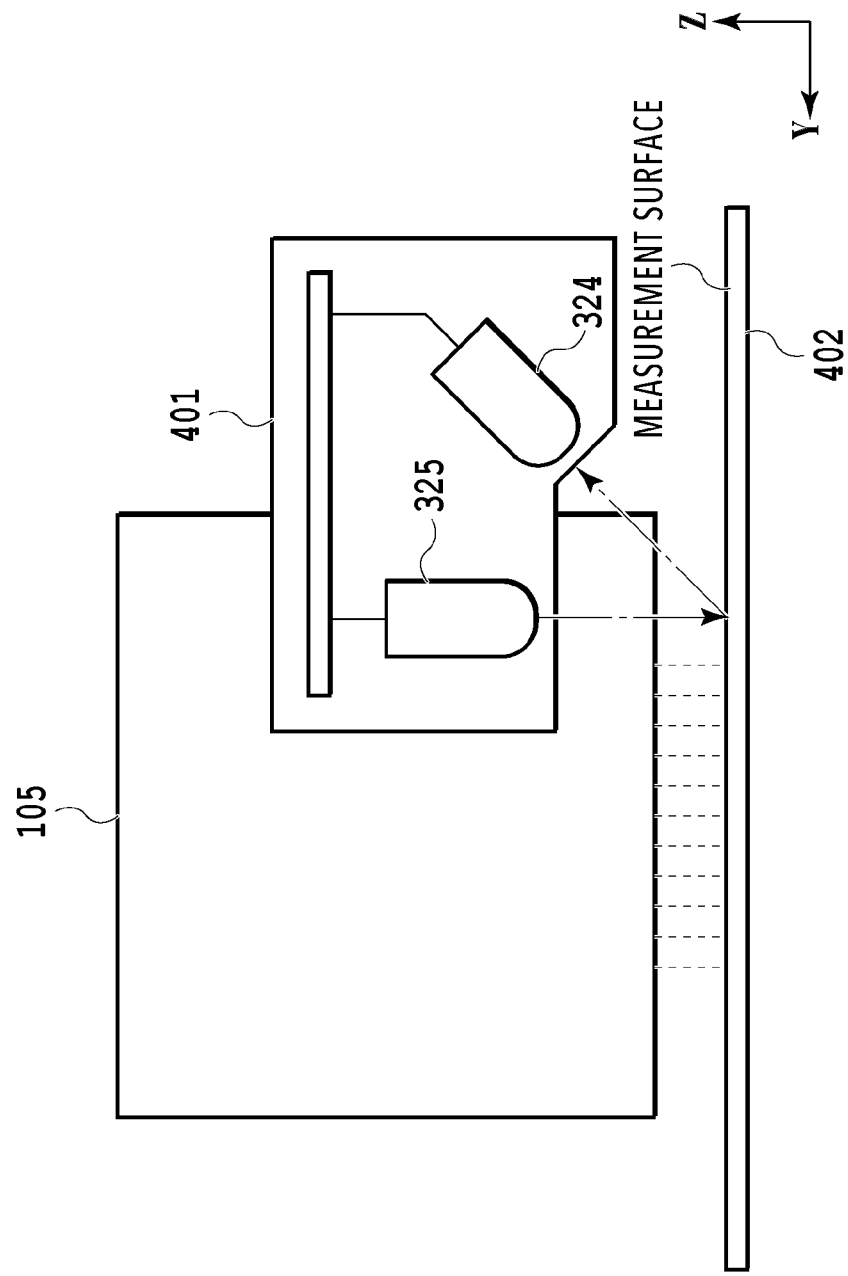
FIG. 4 is a side view for explaining an arrangement of optical elements of a sheet edge detection sensor.

FIG. 4 is a side view for explaining an arrangement of optical elements of the sheet edge detection sensor 401. The sheet edge detection sensor 401 is provided at one end of the carriage 105 in the main scanning direction. The sheet edge detection sensor 401 in this example is configured of a single light emitting element and a single light receiving element. The light receiving element is the phototransistor 324. The light emitting element is the visible light LED 325. The phototransistor 324 is disposed so as to receive light from the LED 325 diffusely reflected at an angle of 45 degrees. The light receiving region of the phototransistor 324 is adjusted by an opening formed by a cover member of the sheet edge detection sensor 401 and is configured to receive a light beam of an approximately 2 mm square at a position above a print sheet 402. The light emitting region of the LED 325 is optimized to be larger than the light receiving region of the phototransistor 324. The sheet edge detection sensor 401 is located upstream of the print head 10 in the conveyance direction of the print sheet 402 (Y direction). The reason for this is to be able to detect an edge of the sheet at a non-printing region in a case of performing sheet edge detection during printing. In other words, the reason is that at a printing region the amount of reflected light is smaller, thereby lowering the detection sensitivity.

<Processing in Borderless Printing>

The printing apparatus 100 in this embodiment is configured to be capable of detecting sheet edges by means of the sheet edge detection sensor 401 in a case of printing a borderless image. The reason is to reduce the amount of ink consumption in the borderless printing and lengthen the life of a waste ink collection mechanism. Also, in consideration of the variation in sensor characteristics, the variation in attachment position, and the like, a light amount adjustment process is performed on the sheet edge detection sensor 401. In this embodiment, in the light amount adjustment process, the presence of an effect of ambient light is determined, and the sheet edge detection using the sheet edge detection sensor 401 is not performed in a case where an effect of ambient light is present. On the other hand, in a case where no effect of ambient light is present, the sheet edge detection using the sheet edge detection sensor 401 is performed while printing is performed with the print head 10. Then, the printing start position and the printing end position are set at appropriate positions according to the detection result. In this way, borderless printing is executed with the extra-printing amount minimized.

Figure 5:
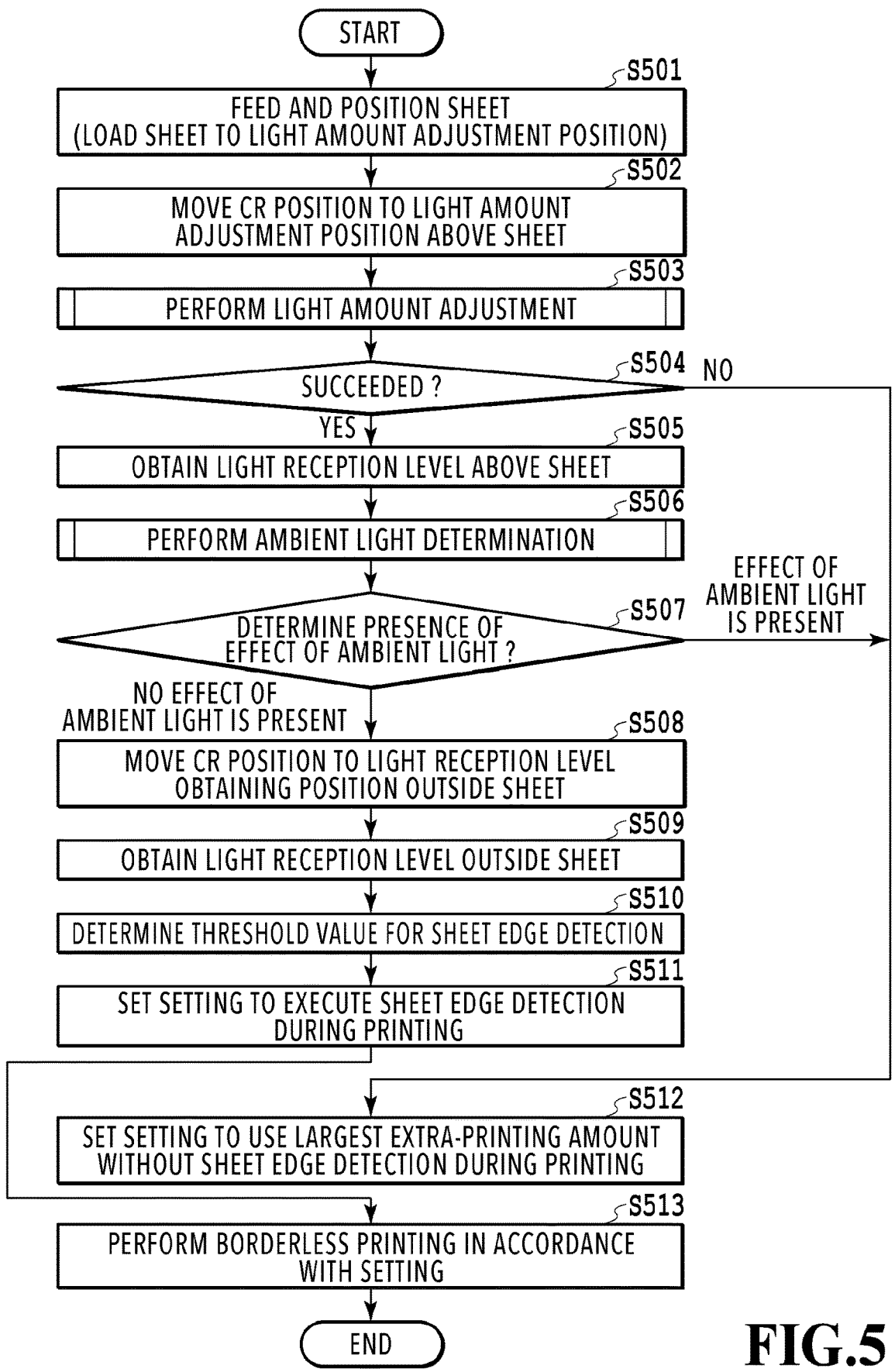
FIG. 5 is a diagram illustrating an example flowchart of processing in borderless printing.

FIG. 5 is a diagram illustrating an example flowchart of processing in borderless printing in this embodiment. The flowchart of FIG. 5 includes a light amount adjustment process executed before the printing and sheet edge detection, and an ambient light determination process. In this example, the ambient light determination process of determining the presence of an effect of ambient light is performed after the light amount adjustment process is performed. Specifically, the ambient light determination process is performed after the light amount adjustment process is performed but before the sheet edge detection process is performed. The CPU 301 implements the flowchart of FIG. 5 by executing the program stored in the flash memory 303, for example. In other words, the processing in FIG. 5 is performed via control by the CPU 301. Meanwhile, the symbol "S" in the description of each process means a step in the flowchart (the same applies below herein).

The processing in FIG. 5 is performed in a case where the printing apparatus 100 receives print data (print job) on a borderless image from the host PC. A description will be given here using an example in which a print job is received from the host PC. Alternatively, the processing illustrated in FIG. 5 may be performed in a case where the CPU 301 receives a print job stored in the RAM 302 or the like. Incidentally, the printing apparatus 100 is capable of selecting whether or not to execute the light amount adjustment process based on a user setting, and the processing illustrated in FIG. 5 is performed in a case where the light amount adjustment process has been set to be executed by the user.

In a case where the printing apparatus 100 receives print data on a borderless image from the host PC, then in S501, the sheet conveyance motor control circuit 306 conveys a print sheet 402 to a light amount adjustment position for the light amount adjustment of the sheet edge detection sensor 401. After the completion of the conveyance of the sheet, then in S502, the carriage motor control circuit 307 moves the carriage 105 so that the sheet edge detection sensor 401 can reach the light amount adjustment position above the conveyed print sheet 402. Incidentally, S501 and S502 may be performed in in reverse order or in parallel.

After the completion of movement of the print sheet 402 and the carriage 105 to the light amount adjustment position, then in S503, the CPU 301 performs the light amount adjustment process. In the light amount adjustment process, the amount of light is adjusted such that the level of the voltage outputted from the amplification circuit 321 connected to the phototransistor 324 being a light receiving unit (hereinafter referred to as the light reception level) becomes an optimal voltage level. This adjustment of the amount of light includes at least one of an adjustment of the gain level of the amplification circuit 321 and an adjustment of the amount of current to be supplied to the LED 325 being a light emitting unit. A detailed adjustment method will be described later.

After the light amount adjustment process in S503, the CPU 301 determines in S504 whether the light amount adjustment in S503 has succeeded. The CPU 301 proceeds to S505 if the light amount adjustment has succeeded, and proceeds to S512 if the light amount adjustment has not succeeded.

In S505, the CPU 301 obtains the light reception level above the print sheet 402 stored in the RAM 302 after the completion of the light amount adjustment. Then in S506, the CPU 301 performs the ambient light determination process. In the ambient light determination process, the presence of an effect of ambient light is determined by comparing the light reception level (the output from the amplification circuit 321) obtained in S505 and the light reception level in a state where the LED 325 of the sheet edge detection sensor 401 is turned off. Though details of the ambient light determination method will be described, the ambient light determination is performed after the light amount adjustment in this embodiment. The reason is that the presence of an effect of ambient light cannot be properly determined without properly adjusting the light reception level in the state where the LED 325 is turned on and then obtaining the light reception level in a turned-off state with the same setting as that for the adjustment in the turned-on state. As a result of the ambient light determination process in S506, whether an effect of ambient light is present is determined.

In S507, the CPU 301 determines whether an effect of ambient light is present. If no effect of ambient light is present, the CPU 301 proceeds to S508. If, on the other hand, an effect of ambient light is present, the CPU 301 proceeds to S512. In S512, the CPU 301 sets a setting to not perform sheet edge detection during the printing. Specifically, the CPU 301 sets a setting to perform borderless printing with a predetermined extra-printing amount. S512 is a process performed in the case where an effect of ambient light is present or the light amount adjustment process has failed. In these cases, there is a possibility that the sheet edge detection process cannot be performed during the printing or the accuracy of the sheet edge detection process has dropped. Printing the desired image is more in line with the user need than reducing the amount of ink consumption during the borderless printing and lengthening the life of the waste ink collection mechanism. Thus, in order to print the desired image, a predetermined extra-printing amount (in this example, a preset largest extra-printing amount) is set.

In the case where no effect of ambient light is present, control is performed so as to perform sheet edge detection during the printing. In S508, the carriage motor control circuit 307 moves the carriage 105 such that the sheet edge detection sensor 401 is located at a predetermined position outside the print sheet. In S509, the CPU 301 turns on the LED 325 and obtains the light reception level outside the print sheet 402. In S510, the CPU 301 determines a threshold value for the sheet edge detection based on the light reception level above the print sheet 402 obtained in S505 and the light reception level outside the sheet obtained in S509. In this example, the threshold value is the median value between the light reception level above the sheet obtained in S505 and the light reception level outside the sheet obtained in S509. Note that the threshold value is not limited to this example. It only needs to be a value between the light reception level obtained in S505 and the light reception level obtained in S509, and is preferably the median value between them. In S511, the CPU 301 sets a setting to perform the sheet edge detection during the printing by using the threshold value determined in S510.

In S513, the CPU 301 performs printing in accordance with the setting set in S511 or S512.

<Light Amount Adjustment>

Figure 6A:
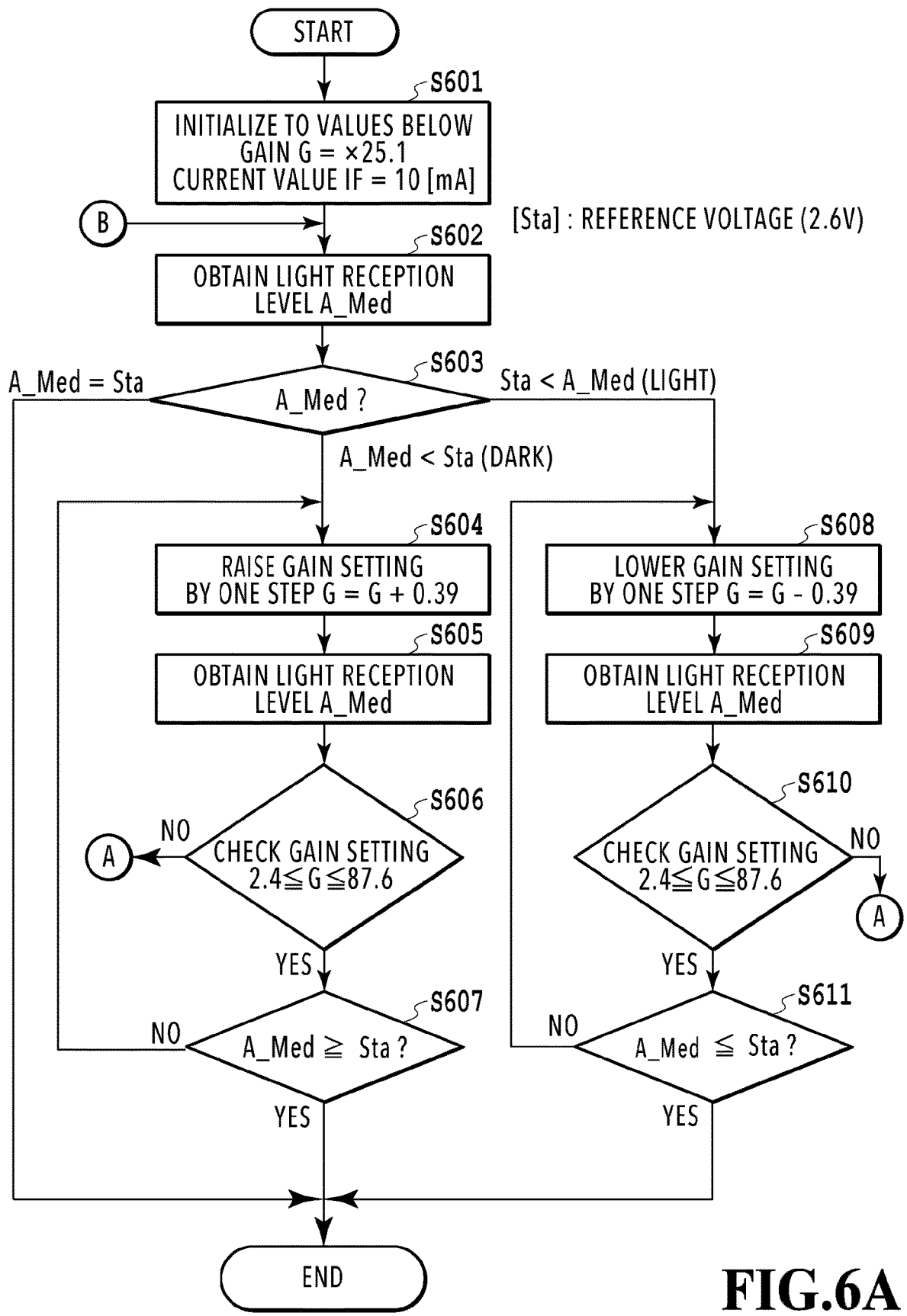
FIGS. 6A and 6B are flowcharts illustrating an example of detailed processing in a light amount adjustment process.
Figure 6B:
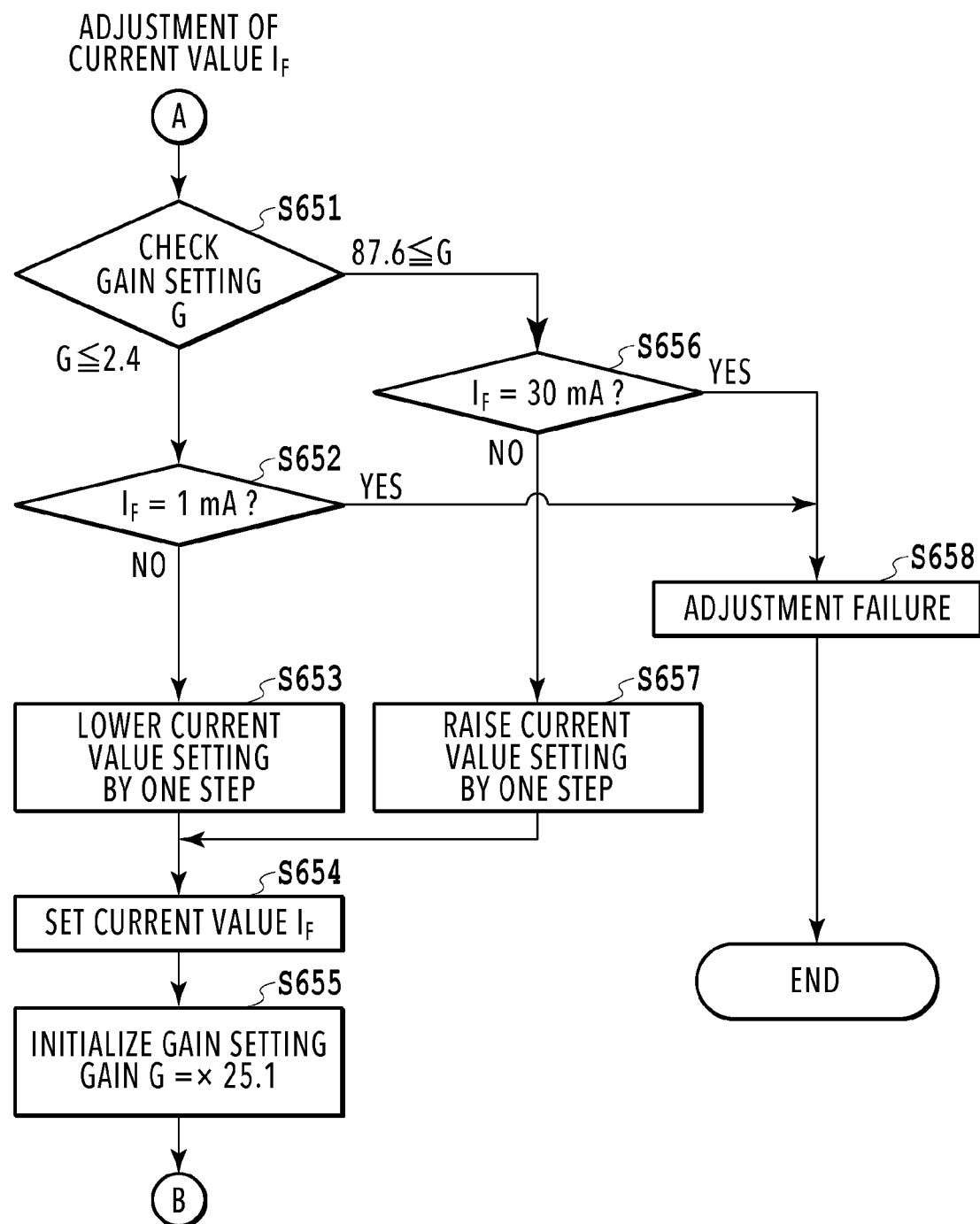

FIGS. 6A and 6B are flowcharts illustrating an example of detailed processing in the light amount adjustment process in S503. The light amount adjustment is performed in order to correct the variation of the light emitting unit and the light receiving unit of the sheet edge detection sensor 401, the variation in the accuracy of the attachment position, the variation in the reflectivity of the print sheet, and so on and thereby perform stable sheet edge position detection. The CPU 301 performs the light amount adjustment process in FIGS. 6A and 6B by controlling the LED driving circuit 323 or the amplification circuit 321. Note that each numerical value described in FIGS. 6A and 6B is a mere example and is not limited to this example.

Firstly, the CPU 301 initializes a gain setting value G of the amplification circuit 321 connected to the phototransistor 324 to ×25.1 and initializes an LED driving current value $I_F$ of the LED driving circuit 323 to 10 mA (S601). The amplification circuit 321 in this embodiment is capable of setting a gain setting value G of ×0.1 to ×99.7 with an 8-bit digital signal (i.e., 1 LSB=×0.39). Also, the LED driving circuit 323 in this embodiment is capable of setting the driving current value $I_F$ in a stepwise manner by selecting a value from among 1 mA, 2 mA, 5 mA, 10 mA, 20 mA, and 30 mA.

After completing the initialization of the gain setting value G and the driving current value $I_F$, the CPU 301 obtains a light reception level A_Med above the sheet (S602). The CPU 301 compares the light reception level A_Med and a reference voltage Sta with each other (S603). The adjustment is done if the light reception level A_Med and the reference voltage Sta are equal.

If the light reception level A_Med is lower (darker) than the reference voltage Sta in S603, the CPU 301 raises the gain setting value G by one step (S604) and obtains the light reception level A_Med (S605). The reference voltage Sta in this embodiment is 2.6 V. Then, the CPU 301 checks the gain setting value G (S606) and, if the gain setting value G is outside a predetermined range (in this example, outside a range of ×2.4 to ×87.6), performs an adjustment of the driving current value $I_F$ to be described later. In the case where the gain setting value G is outside such a predetermined range, a sufficient adjustment cannot be made by adjusting the gain setting value G. The adjustment of the driving current value $I_F$ is therefore performed. If, on the other hand, the gain setting value G is in the predetermined range (in this example, in the range of ×2.4 to ×87.6), the CPU 301 compares the light reception level A_Med and the reference voltage Sta with each other (S607). Then, if the light reception level A_Med is higher than or equal to the reference voltage Sta, the adjustment is done. If, on the other hand, the light reception level A_Med is lower than the reference voltage Sta, the CPU 301 returns to S604 and repeats the adjustment.

If the light reception level A_Med is higher (lighter) than the reference voltage Sta in S603, the CPU 301 lowers the gain setting value G by one step (S608) and obtains the light reception level A_Med (S609). Then, the CPU 301 checks the gain setting value G (S610) and, if the gain setting value G is outside the predetermined range (outside the range of ×2.4 to ×87.6), performs the adjustment of the driving current value $I_F$. If the gain setting value G is in the predetermined range (in the range of ×2.4 to ×87.6), the CPU 301 compares the light reception level A_Med and the reference voltage Sta with each other (S611). Then, if the light reception level A_Med is lower than or equal to the reference voltage Sta, the adjustment is done. If the light reception level A_Med is higher than the reference voltage Sta, the CPU 301 returns to S608 and repeats the adjustment.

If the result of the check of the gain setting value G in S606 or S610 indicates that the gain setting value is outside the predetermined range (outside the range of ×2.4 to ×87.6), the CPU 301 proceeds to S651 to set the driving current value $I_F$.

In S651, the CPU 301 checks the gain setting value G and, if the gain setting value G is ×2.4 or lower, proceeds to S652, in which the CPU 301 checks the currently set driving current value $I_F$. If the driving current value $I_F$ is set at 1 mA, which is the lowest settable value, the light reception level cannot be lowered any further. The CPU 301 therefore proceeds to S658, in which the adjustment is terminated as a failure. In the case where the adjustment fails, the printing will be performed with the largest extra-printing amount without performing sheet edge detection during the printing (No in S504 in FIG. 5 and the CPU 301 proceeds to S512). If the currently set driving current value $I_F$ is not 1 mA, the CPU 301 lowers the current value setting by one step in S653, and then sets the driving current value $I_F$ for the LED driving circuit 323 (S654).

If, on the other hand, the result of the check of the gain setting value G in S651 indicates that the gain setting value G is set at ×87.6 or higher, the CPU 301 proceeds to S656, in which it checks the currently set driving current value $I_F$. If the driving current value $I_F$ is set at 30 mA, which is the highest settable value, the light reception level cannot be raised any further. The CPU 301 therefore proceeds to S658, in which the adjustment is terminated as a failure. In the case where the adjustment fails, the printing will be performed with the largest extra-printing amount without performing sheet edge detection during the printing. If the currently set driving current value $I_F$ is not 30 mA, the CPU 301 raises the current value setting by one step in S657, and then sets the driving current value $I_F$ for the LED driving circuit 323 (S654).

After setting the driving current value $I_F$ in S654, the CPU 301 initializes the gain setting value G to ×25.1 and returns to S602 to continue the light amount adjustment. The above is the description of the light amount adjustment process.

<Sheet Edge Detection and Effect of Ambient Light>

Figure 7:
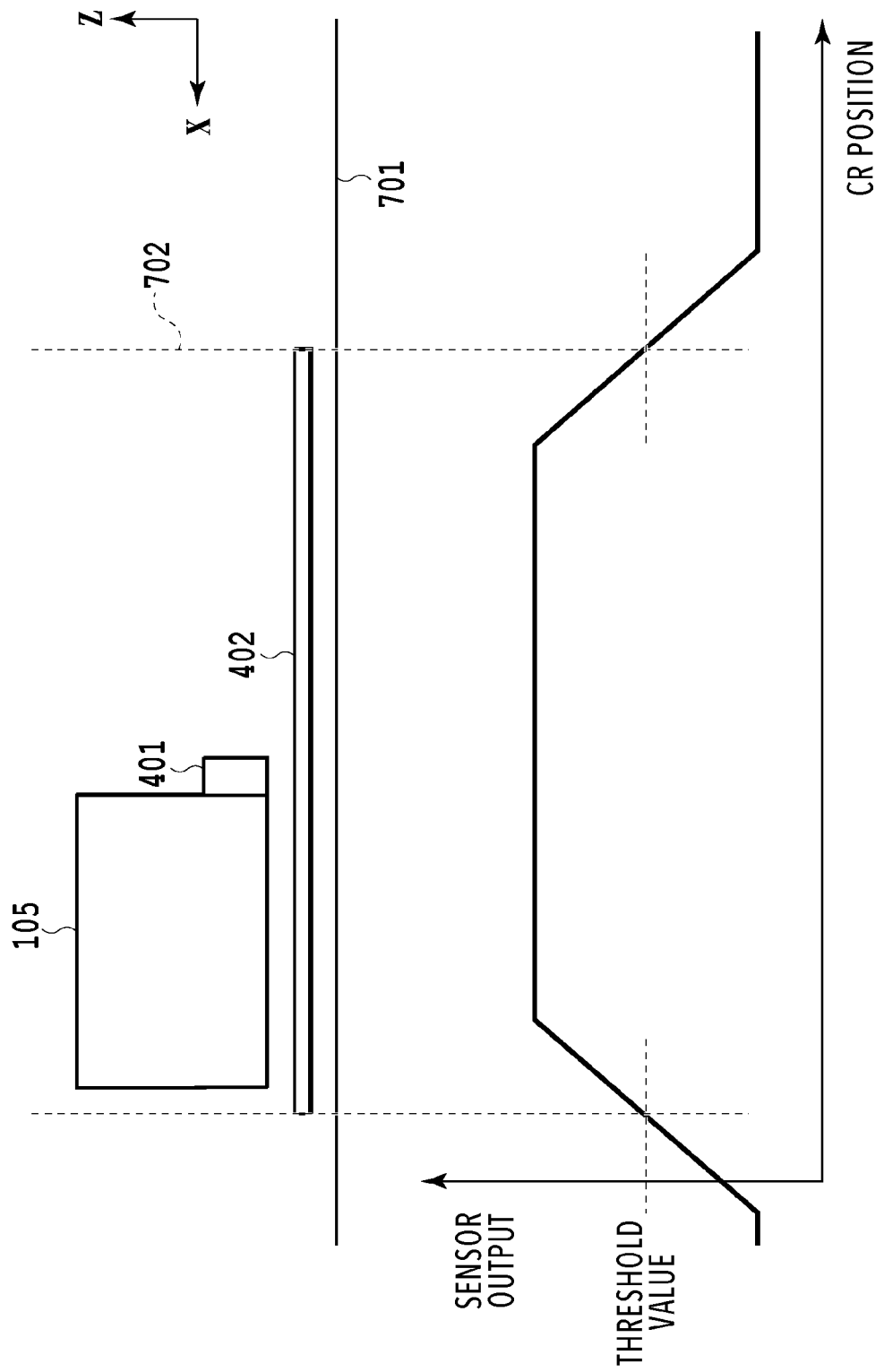
FIG. 7 is a diagram conceptually explaining a method of detecting edges of a print sheet.

FIG. 7 is a diagram conceptually explaining a method of detecting edges of a print sheet 402 being a print medium. In FIG. 7, the sheet edge detection sensor 401 is provided on the right side of the carriage 105 with respect to the sheet surface (−X direction side). Also, FIG. 7 illustrates the position of the carriage 105 in the main scanning direction (CR position) and the light reception level of light received by the sheet edge detection sensor 401 at the CR position.

The LED 325 of the sheet edge detection sensor 401 is turned on and the carriage 105 is moved from above the print sheet 402 to an edge of the print sheet 402. Then, when the center of the light receiving region of the sheet edge detection sensor 401 crosses the position of a sheet edge 702, the output of the sensor becomes ½ of the sum of the light reception level above the print sheet 402 and the light reception level above a platen 701, which is outside the print sheet. Thus, the CPU 301 determines and stores ½ of the sum of the light reception level above the print sheet and the light reception level outside the print sheet as a threshold value (S510), and sets the carriage position at which this value is crossed as a print sheet edge. Note that the light reception level above the print sheet used to determine the threshold value is a value after the adjustment in the light amount adjustment explained in FIGS. 6A and 6B. Ideally, the threshold value thus set is used to detect edges of the print sheet 402 to determine proper edge positions of the print sheet. However, during the light amount adjustment, ambient light may get in through a sheet discharge port or the like and the light receiving unit of the sheet edge detection sensor 401 may receive the ambient light as well as the light from the light emitting unit. Specifically, the amount of ambient light may be different between when the light amount adjustment is performed and when a printing operation is performed with sheet edge detection. This may deteriorate the accuracy of the sheet edge detection. Consequently, the printing start position and the printing end position at the sheet edges may be shifted, thereby deteriorating the image quality. This will be described below using FIG. 8.

Figure 8:
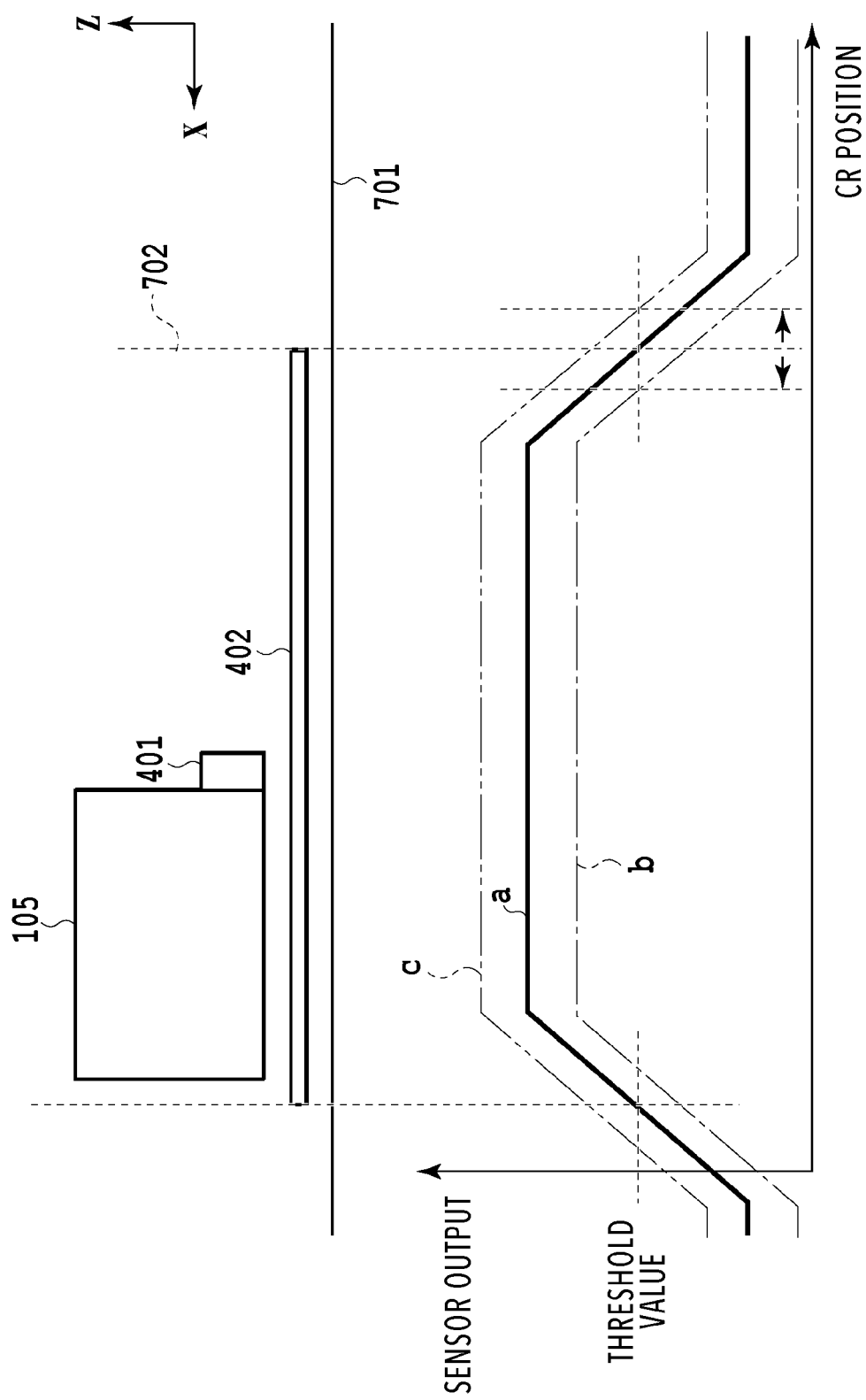
FIG. 8 is a diagram conceptually explaining changes in sensor output value in response to changes in ambient light.

FIG. 8 is a diagram conceptually explaining changes in sensor output value (light reception level) in response to changes in ambient light after performing the light amount adjustment and determining the threshold value. A sensor output a is a sensor output in a case where the ambient light is the same in the light amount adjustment and the sheet edge detection, and is equivalent to the sensor output illustrated in FIG. 7.

A sensor output b is a sensor output in a case where the level of the ambient light becomes lower than in the light amount adjustment after performing the light amount adjustment and determining the threshold value. In this case, the light reception level in the sheet edge detection is lower. The threshold value has been determined before the level of the ambient light becomes lower. For this reason, the sensor output crosses the threshold value at a position on the inside of the sheet from the actual sheet edge 702, as illustrated in FIG. 8. Accordingly, the printing start position setting and the printing end position setting shift to the inside of the sheet.

A sensor output c is a sensor output in a case where the level of the ambient light becomes higher than in the light amount adjustment after performing the light amount adjustment and determining the threshold value. In the case of the sensor output c, the light reception level in the sheet edge detection is higher. For this reason, the sensor output crosses the threshold value at a position on the outside of the sheet from the actual sheet edge 702, as illustrated in FIG. 8. Accordingly, the printing start position setting and the printing end position setting shift to the outside of the sheet.

Here, the extra-printing amount increases in the case where the printing start position and the printing end position shift to the outside from the actual sheet edges. That is, although sheet edge detection is performed, the amount of ink consumption and the like cannot be reduced. Nonetheless, borderless printing itself is still performed on the print sheet 402, and therefore the effect on the image is low. On the other hand, the shift of the printing start position and the printing end position to the inside from the actual sheet edges results in formation of a border despite the intention to print a borderless image. Thus, the desired image is not printed. The effect on the image is therefore high. In view of the above, in this embodiment, it is determined that an effect of ambient light is present in a case where the effect of the ambient light on the image is high, and borderless printing is performed with a predetermined extra-printing amount.

Specifically, a process is performed in which it is determined whether the positions of the sheet edges to be detected have a possibility of shifting to the inside from the actual sheet edges in a case of performing the sheet edge detection process in a state where the amount of the incoming ambient light is smaller than that at the point when the light amount adjustment was performed. If there is a possibility of shift to the inside, it is determined that an effect of ambient light is present, and borderless printing is performed with the predetermined extra-printing amount.

<Ambient Light Determination Process>

Next, the process of determining whether an effect of ambient light is present will be described. The effect of ambient light can be evaluated by using the light reception level in a state where the LED 325 is turned off and the light reception level in a state where the LED 325 is turned on. Note that the above light reception level in the state where the LED 325 is turned on is the light reception level after the light amount adjustment. Specifically, it is the light reception level obtained in the light amount adjustment performed with the LED 325 turned on to obtain an appropriate light reception level above the sheet.

In a case where the amount of the incoming ambient light in the light amount adjustment is greater than a predetermined amount, the light reception level is a value greater than a predetermined level even with the LED 325 turned off. In the case where the amount of the incoming ambient light is greater than the predetermined amount, the driving current value of the LED 325 or the gain setting value G of the amplification circuit 321 is set by the light amount adjustment at a lower value than that in a case where the amount of the incoming ambient light is less than the predetermined amount. Thus, the light reception level remains at a relatively large value even with the LED 325 turned off. In other words, the amount of the incoming ambient light in the light amount adjustment is greater than the predetermined amount if the light reception level in the state where the LED 325 is turned off to the light reception level in the state where the LED 325 is turned on is a certain value or greater. In this case, if the amount of the incoming ambient light decreases while borderless printing is performed with sheet edge detection, the printing start position and the printing end position will shift to the inside from the actual sheet edges, as mentioned earlier.

Now, suppose a case where the driving current value of the LED 325 obtained as a result of the light amount adjustment is greater than a predetermined value. In such a case, the driving current value of the LED 325 is assumed to have been set to be greater than the predetermined value due to the amount of the incoming ambient light being relatively small in the light amount adjustment. Then, even if the amount of the incoming ambient light in the light amount adjustment further decreases while the subsequent borderless printing is performed, the effect on the image is low since the degree of effect in the light amount adjustment is low. Also, even if the amount of the incoming ambient light in the light amount adjustment increases while the subsequent borderless printing is performed, the printing start position and the printing end position shift to the outside from the actual sheet edges, which merely increases the extra-printing amount. That is, the effect on the image is low.

In view of the above, in this embodiment, the value of $P_{OFF}/P_{ON}$ is calculated, where $P_{ON}$ is the light reception level in the state where the LED 325 is turned on, and $P_{OFF}$ is the light reception level in the state where the LED 325 is turned off. Then, the CPU 301 determines that an effect of ambient light is present if $P_{OFF}/P_{ON}$ is greater than a certain value, and determines that no effect of ambient light is present if $P_{OFF}/P_{ON}$ is the certain value or less.

Figure 9:
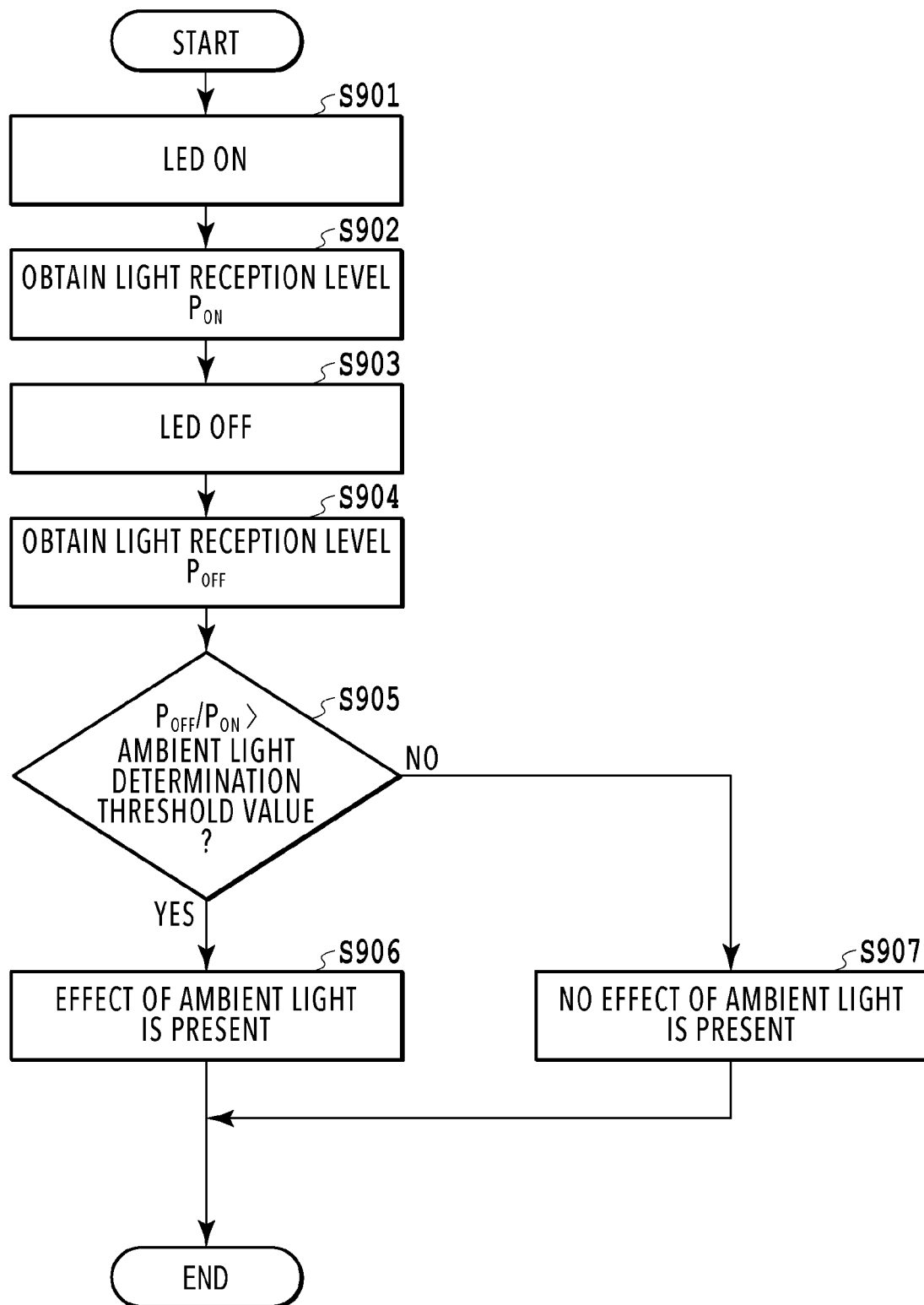
FIG. 9 is a diagram illustrating a flowchart for making a determination on whether an effect of ambient light is present.

FIG. 9 is a diagram illustrating a flowchart for making a determination on whether an effect of ambient light is present, which is made in S506.

The CPU 301 turns on the LED 325 of the sheet edge detection sensor 401 (S901). The CPU 301 then obtains the light reception level $P_{ON}$ in the state where the LED 325 is turned on (S902). Incidentally, the CPU 301 may obtain the light reception level after the light amount adjustment obtained in S505. Thereafter, the CPU 301 turns off the LED 325 of the sheet edge detection sensor 401 (S903). The CPU 301 then obtains the light reception level Pond in the state where the LED 325 is turned off (S904).

Thereafter, the CPU 301 compares the value of $P_{OFF}/P_{ON}$ and an ambient light determination threshold value (the above-mentioned certain value) with each other. In a case where the value of $P_{OFF}/P_{ON}$ is greater than the ambient light determination threshold value, the CPU 301 determines that there will be an effect on the image if the amount of the incoming ambient light decreases. In this case, the CPU 301 sets a setting to perform printing with the largest extra-printing amount without performing sheet edge detection during the printing (see S512). On the other hand, in a case where the value of $P_{OFF}/P_{ON}$ is the ambient light determination threshold value or less, the CPU 301 determines that there will not be an effect on the image even if the amount of the incoming ambient light decreases. In this case, the CPU 301 sets a setting to perform printing with the smallest extra-printing amount while performing sheet edge detection during the printing (see S511). Note that the user can set the largest extra-printing amount and the smallest extra-printing amount on the operation panel 319. Also, the ambient light determination threshold value is a different threshold value from the threshold value for sheet edge detection described earlier.

<Sheet Edge Detection Process>

Next, the sheet edge detection process performed in the case where the setting to perform sheet edge detection during the printing is set in S511 will be described with reference to FIG. 7 again. Basically, in the sheet edge detection process, a process of detecting sheet edges with the sheet edge detection sensor 401 is performed in each scan. Then, the printing start position and the printing end position obtained as a result of the detection will be used in the scan following the scan in which the detection is performed. Also, as mentioned earlier, sheet edge detection is performed during a movement of the carriage 105 from above the sheet to the outside of the sheet. Specifically, in the example of FIG. 7, detection is performed during a movement of the carriage 105 from above the sheet to the right side of the sheet surface (right edge detection) and also detection is performed during a movement of the carriage 105 from above the sheet to the left side of the sheet surface (left edge detection) are performed. The reason is that the detection accuracy of the detection value is higher in a case of detecting the change from above the sheet, on which the detection value is stable. Incidentally, in the initial scan or depending on the sheet size, it may be impossible to detect the printing start position on one side. In this case, the corresponding portion is subjected to borderless printing with the largest extra-printing amount.

As described above, the printing apparatus according to the embodiment of the present invention performs the ambient light determination process after the light amount adjustment of the sheet edge detection sensor 401 in a case of performing a printing operation based on print data (print job) on borderless printing. In the ambient light determination process, it is determined whether there will be an effect on the image if the amount of the incoming ambient light decreases after performing the light amount adjustment and determining the threshold value. In the case where it is determined that there will be an effect on the image if the amount of the incoming ambient light decreases, the extra-printing amount in the borderless printing is set at a predetermined amount (e.g., the largest amount) and the printing is performed. In this way, it is possible to reduce the effect on the image and print the desired image.

Other Embodiments

In the above embodiment, an example has been described in which the light amount adjustment process and the ambient light determination process are performed in a case where print data (print job) as an instruction to perform borderless printing is received. Here, in a case where a print job containing a plurality of pages to print a borderless image is received, the light amount adjustment process and the ambient light determination process may be performed prior to the printing of the first page, and the light amount adjustment process, etc. do not have to be performed again for the printing of the subsequent pages. This is to shorten the printing time.

In the above embodiment, an example has been described in which the presence of an effect of ambient light is determined based on the light reception level above the print sheet 402 in the state where the LED 325 is turned on and the light reception level above the print sheet 402 in the state where the LED 325 is turned off. Further, the light reception level outside the print sheet in the state where the LED 325 is turned on and the light reception level outside the print sheet in the state where the LED 325 is turned off may be additionally obtained. The reason is that the threshold value for sheet edge detection is calculated from the light reception level above the sheet and the light reception level outside the sheet. Thus, it may be determined that an effect of ambient light is present in a case where the ratio of the light reception level outside the sheet in the state where the LED 325 is turned off to the light reception level outside the sheet in the state where the LED 325 is turned on is above a predetermined value, even if the ratio between the light reception levels above the sheet is not above the ambient light determination threshold value. Thus, the error in edge detection in a case where the amount of ambient light decreases can be accurately figured out by using the light reception levels above the sheet in the state where the LED 325 is turned on and in the state where the LED 325 is turned off and the light reception levels outside the sheet in the state where the LED 325 is turned on and in the state where the LED 325 is turned off.

Also, in the above embodiment, an example has been described in which borderless printing is executed with the largest extra-printing amount without executing sheet edge detection during the printing in a case where it is determined that an effect of ambient light is present. However, the extra-printing amount may be varied according to the degree of effect of the ambient light. Specifically, a smaller extra-printing amount than the largest extra-printing amount may be set in a case where the effect of the ambient light is relatively low.

Also, in the above embodiment, an example has been described in which the print head 10 is mounted on the carriage 105, and sheet edges are detected with the sheet edge detection sensor 401 while the print head 10 is scanned to print an image. However, the present invention is not limited to this example. A printing apparatus using a so-called line-type print head 10 in which ejection openings are disposed to extend in the width direction of a print sheet may be equipped with a carriage for sheet edge detection and detect sheet edges in a similar manner to the above embodiment.

Also, in the above embodiment, an example has been described in which detection with the sheet edge detection sensor 401 is not performed in a case of executing borderless printing with the largest extra-printing amount. Specifically, the carriage 105 is scanned without causing the LED 325 to emit light in the case of executing borderless printing with the largest extra-printing amount. However, the present invention is not limited to this example. A configuration may be employed in which the LED 325 is caused to emit light in the case of executing borderless printing with the largest extra-printing amount and the level of the received light is not used to perform a sheet edge detection process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-026146, filed Feb. 19, 2020, which is hereby incorporated by reference herein in its entirety.

What is claimed is:

1. A printing apparatus comprising:
a conveyance unit configured to convey a sheet in a conveyance direction;
a print unit configured to perform printing on the sheet conveyed by the conveyance unit;
a light receiving unit configured to receive light and make an output according to the received light; and
a control unit configured to control borderless printing by the print unit, the borderless printing including extra-printing from a sheet edge to outside of the sheet,
wherein after the light receiving unit makes the output according to the received light, the control unit sets an extra-printing amount, based on the output, by which printing extends off the sheet edge.

2. The printing apparatus according to claim 1, further comprising:
a light emitting unit for emitting light; and
a detection unit configured to detect the sheet edge of the sheet based on the output from the light receiving unit when the light emitting unit emits light to the sheet.

3. The printing apparatus according to claim 2, wherein the control unit changes the extra-printing amount from the sheet edge based on the output from the light receiving unit after the output from the light receiving unit is adjusted so as to become predetermined level in a case where the control unit obtains an instruction to perform the borderless printing.

4. The printing apparatus according to claim 2, wherein the control unit determines, based on the output from the light receiving unit, not to execute the detection by the detection unit in the borderless printing.

5. The printing apparatus according to claim 2, wherein the control unit sets the extra-printing amount from the sheet edge based on a position of the sheet edge detected by the detection unit in the borderless printing in a case where the control unit determines, based on the output from the light receiving unit, to execute the detection by the detection unit.

6. The printing apparatus according to claim 2, wherein the control unit sets the extra-printing amount based on a first output from the light receiving unit when the light emitting unit emits light and a second output from the light receiving unit when the light emitting unit does not emit light.

7. The printing apparatus according to claim 6, wherein the light emitting unit is caused to emit light and not to emit light above the sheet.

8. The printing apparatus according to claim 6, wherein the light emitting unit is caused to emit light and not to emit light outside the sheet.

9. The printing apparatus according to claim 2, further comprising an adjustment unit configured to adjust at least one of an amount of light to be emitted from the light emitting unit and the output from the light receiving unit such that the output from the light receiving unit when the light emitting unit emits light to a predetermined position on the print sheet is at a predetermined level.

10. The printing apparatus according to claim 9, wherein the detection unit further includes:
an emitted light amount control unit configured to control the amount of light to be emitted from the light emitting unit; and
a received light amount amplification unit configured to amplify an amount of light received with the light receiving unit,
wherein the adjustment unit performs the adjustment by controlling at least one of the emitted light amount control unit and the received light amount amplification unit.

11. The printing apparatus according to claim 9, wherein the control unit sets the extra-printing amount based on the output from the light receiving unit after the adjustment by the adjustment unit.

12. The printing apparatus according to claim 1, wherein the control unit sets a predetermined extra-printing amount as the extra-printing amount from the sheet edge based on the output from the light receiving unit.

13. The printing apparatus according to claim 1, wherein the control unit determines whether an effect of ambient light is present based on the output from the light receiving unit.

14. The printing apparatus according to claim 13, wherein the control unit determines that the effect of ambient light is present in a case where a ratio of the output from the light receiving unit when the light emitting unit does not emit light to the output from the light receiving unit when the light emitting unit emits light is greater than a predetermined threshold value.

15. The printing apparatus according to claim 1, wherein the print unit is a print head arranged on a carriage and configured to eject a droplet.

16. A method of controlling a printing apparatus, the printing apparatus comprising:
a conveyance unit configured to convey a sheet in a conveyance direction;
a print unit configured to perform printing on the sheet conveyed by the conveyance unit; and
a light receiving unit configured to receive light and make an output according to the received light,
the method comprising:
controlling borderless printing by the print unit, the borderless printing including extra-printing from the sheet edge to outside of the sheet, and
after the light receiving unit makes the output according to the received light, setting an extra-printing amount, based on the output, by which printing extends off the sheet edge.

17. The method according to claim 16, wherein the printing apparatus further comprises:
- a light emitting unit for emitting light; and
- a detection unit configured to detect the sheet edge of the sheet based on the output from the light receiving unit when the light emitting unit emits light to the sheet.

18. The method according to claim 17, wherein the extra-printing amount from the sheet edge changes based on the output from the light receiving unit after the output from the light receiving unit is adjusted so as to become a predetermined level in a case where an instruction to perform the borderless printing is obtained.

19. The method according to claim 17, wherein based on the output from the light receiving unit, the detection by the detection unit is determined not to be executed in the borderless printing.

20. The method according to claim 17, wherein the extra-printing amount from the sheet edge is set based on a position of the sheet edge detected by the detection unit in the borderless printing in a case where the detection by the detection unit is determined to be executed based on the output from the light receiving unit.

21. The method according to claim 17, wherein the extra-printing amount is set based on a first output from the light receiving unit when the light emitting unit emits light and a second output from the light receiving unit when the light emitting unit does not emit light.

22. The method according to claim 16, wherein a predetermined extra-printing amount is set as the extra-printing amount from the sheet edge based on the output from the light receiving unit.

* * * * *